Patented June 30, 1953

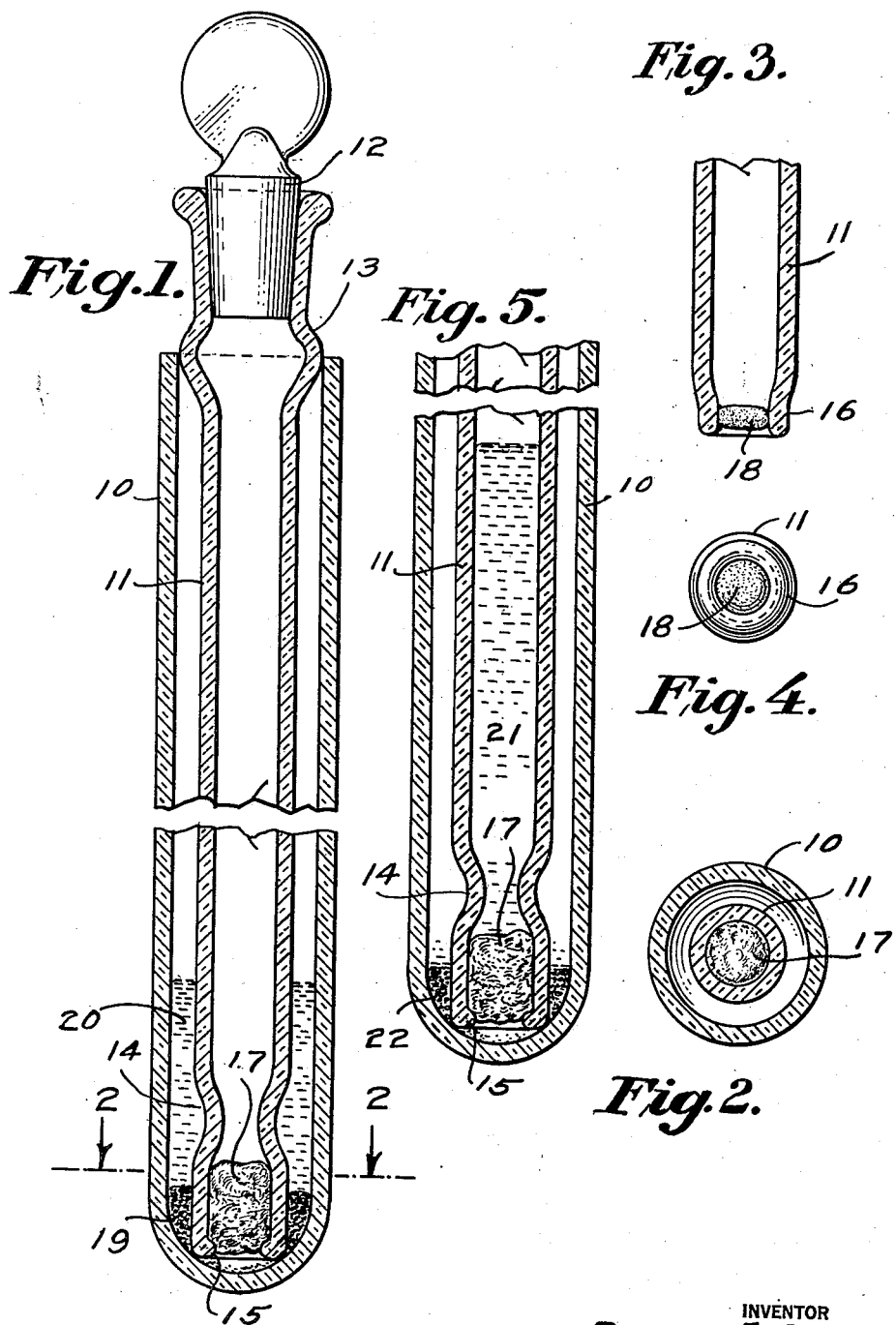

2,643,940

UNITED STATES PATENT OFFICE 2,643,940

EXTRACTOR FOR REMOVING SOLUBLE CONSTITUENTS IN CHEMICAL ANALYSIS

Rollin E. Stevens, Vienna, Va., assignor to the United States of America as represented by the Secretary of the Department of the Interior Application September 14, 1951, Serial No. 246,699

3 Claims. (Cl. 23—259)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 stat. L. 467).

My invention relates to an extractor for separating soluble constituents from granular samples leaving an insoluble residue and is particularly useful in chemical analyses including plant ash, soils and pulverized rocks.

In the accompanying drawing which illustrates a preferred embodiment of my invention:

Figure 1 is a longitudinal section, of my device, containing a ground sample and solvent.

Figure 2 is a section on the line 2—2 of Figure 1.

Figure 3 is a fragmentary section of a modification.

Figure 4 is an end view of the modification shown in Figure 3.

Figure 5 is a fragmentary section showing the filtrate within the extractor tube.

In these drawings, 10 indicates a common form of glass test tube. 11 is an extractor tube which is initially open at opposite ends, one of which is closed by a ground glass tapered stopper 12, and is enlarged at 13 adjacent to the stoppered end to cover without sealing the annular space surrounding the extractor tube 11 without binding against the test tube 10 and is constricted at 14 and 15 (Figure 1) or 16 (Figures 3 and 4) near the opposite end to provide supporting abutments for a porous filter 17 which, for example, may be formed of glass wool or a sintered glass disk 18 (Figures 3 and 4). In Figure 1, the test tube 11 contains a pulverized sample 19 and a liquid solvent 20 which for samples of rock may be a suitable acid. In Figure 5, a filtrate containing the dissolved portion of the sample is indicated by 21 and the undissolved residue by 22.

In the operation of the device, a ground sample is placed in the test tube 10, the volume of acid needed for the extraction is added, and the extractor 11 inserted, with the filter end of the device touching the bottom of the test tube. The test tube and its contents are then placed upright over a source of heat, such as a gas flame or electric hot plate (not shown). As the test tube and contents are heated, air within the extractor 11 expands and is released through the filter 17 or 18 in a continuous stream of air bubbles through the solution which keeps the solution in motion, preventing superheating and eliminating bumping. This stream of air bubbles continues to be released for a time after boiling of the solvent begins, while air pressure above the liquid solvent 20 is vented between the enlargement 13 and the inner wall of the test tube 10 until the pressure within the device comes into equilibrium with that of the atmosphere. On continued heating beyond the point where air ceases to be released from the device, bumping is prevented by the porous nature of the filter medium, which results in continuous and non-violent release of superheat from the many finely divided surfaces of the filter. A continuous stream of bubbles of water vapor rises upward in the constricted area between test tube and the outside walls of the extraction device, keeping the particles of the sample in continuous motion, and hastening the extraction of soluble constituents from the particles. Refluxing of the solvent in the space above the boiling solvent is very efficient and boiling can be continued for an appreciable length of time without material loss of solvent into the atmosphere. The boiling is continued until extraction of soluble constituents is considered complete.

When the heat is removed, the air remaining within the extractor 11 contracts to its normal volume at the cooler temperature, and as it does it draws through the filter the solvent containing the extracted constituents, and leaves behind in the test tube the leached solid residue of the sample, essentially free of solvent. The clear filtrate is then available for testing upon removing the stopper from the top of the device. This clear filtrate is then emptied after removing the ground glass stopper 12 and may be tested by well known methods.

My invention was conceived for supplying a device for automatically extracting and filtering minor elements from soil, rock and plants with the aid of acids or other solvents, and has the advantages over the prior conventional procedures which follow:

(1) "Bumping" is eliminated, both during preliminary heating and during boiling.

(2) Boiling can be continued without attention, for long periods.

(3) The particles of the sample are kept in constant motion in the solvent, thus effecting efficient solution of the soluble constituents.

(4) The loss of solvent vapors into the atmosphere is reduced to negligible proportions.

(5) The extracted soluble constituents are drawn through the filtering stopper into my device when heating is stopped.

(6) The leached solid residue of the sample, essentially free of the solvent and without serious loss, remains in the test tube.

It should be understood that the present disclosure is for the purpose of illustration only and that the invention includes all modifications and equivalents which fall within the scope of the appended claims.

What I claim is:

1. A thermally operated extractor which comprises a first tube, said first tube having a tapered ground stopper seat located in the upper end thereof, a stopper fitted in said seat to close the upper end of said first tube, an annular enlargement located below said stopper seat and proximate thereto, a porous filter held within the lower end of said first tube and occupying the entire area within said lower end, and a second tube disposed concentrically around said first tube, the lower end of said second tube being closed and the upper end of said second tube being open and in nongas-tight contact with said enlargement of said first tube, to maintain said tubes in coaxial relationship.

2. A thermally operated extractor which comprises a first tube, said first tube having a stopper seat located in the upper end thereof, a stopper fitted in said seat to close the upper end of said first tube, an annular enlargement located in the upper end of said first tube below said stopper seat closely adjacent and proximate to said seat, a constriction located in the lower end of said first tube, a porous filter confined within said first tube at the lower end thereof by said constriction and occupying the entire transverse area within said constriction, and a second tube disposed concentrically around said first tube, the upper end of said second tube being open and in nongas-tight contact with the annular enlargement of said first tube to maintain the first and second tubes in coaxial relationship, the lower end of said second tube being closed.

3. A thermally operated extractor which comprises a first tube, said first tube having a stopper seat located in the upper end thereof, a stopper fitted in said seat to close the upper end of said first tube, an annular enlargement located in the upper end of said first tube below said stopper seat closely adjacent and proximate to said seat, two spaced constrictions located in the lower end of said first tube, a porous filter confined within said first tube between said constrictions and occupying the entire area of said tube between said constrictions, and a second tube disposed concentrically around said first tube, the lower end of said second tube being closed and the upper end of said second tube being open and in nongas-tight contact with said enlargement of said first tube to maintain said tubes in coaxial relationship.

ROLLIN E. STEVENS.

References Cited in the file of this patent

UNITED STATES PATENTS

| Number | Name | Date |
|---|---|---|
| 175,066 | Gates | Mar. 21, 1876 |
| 411,596 | Kienth | Sept. 24, 1889 |
| 1,313,626 | Fisher | Aug. 19, 1919 |
| 1,585,447 | Webb | May 15, 1926 |
| 1,722,435 | Leiboff | July 30, 1929 |
| 1,815,711 | Hensel | July 21, 1931 |
| 1,887,126 | Grossman | Nov. 8, 1932 |
| 2,045,866 | Morrison | June 30, 1936 |
| 2,485,739 | Johnstone | Oct. 25, 1949 |

FOREIGN PATENTS

| Number | Country | Date |
|---|---|---|
| 641,844 | Germany | Feb. 15, 1937 |
| 642,347 | Germany | Mar. 1, 1937 |

OTHER REFERENCES

Thorpe, "Dictionary of Applied Chemistry," vol. II, pages 475–483. Publ. Longmans, Green and Co., N. Y. C., 1912.